United States Patent [19]

Sasaki et al.

[11] Patent Number: 4,799,069
[45] Date of Patent: Jan. 17, 1989

[54] LASER RECORDING APPARATUS

[75] Inventors: Yoshikazu Sasaki, Sagamihara; Naoya Misawa, Machida, both of Japan

[73] Assignee: Minolta Camera Kabushiki Kaisha, Osaka, Japan

[21] Appl. No.: 38,367

[22] Filed: Apr. 14, 1987

[30] Foreign Application Priority Data

| Apr. 18, 1986 | [JP] | Japan | 61-91139 |
| Apr. 18, 1986 | [JP] | Japan | 61-91140 |
| Mar. 4, 1987 | [JP] | Japan | 62-49841 |
| Mar. 4, 1987 | [JP] | Japan | 62-49842 |

[51] Int. Cl.⁴ .......... G01D 9/42; H04N 1/21; H01S 3/13
[52] U.S. Cl. .......... 346/108; 358/296; 372/29; 372/31
[58] Field of Search .......... 346/108, 107 R, 76 L, 346/160; 372/24, 25, 26, 28, 29, 31; 358/296

[56] References Cited

U.S. PATENT DOCUMENTS

| 4,480,325 | 10/1984 | Aiki et al. | 369/122 |
| 4,611,352 | 9/1986 | Fujito | 372/31 |
| 4,638,483 | 1/1987 | Bowers | 372/26 |
| 4,665,524 | 5/1987 | Cotler | 372/29 |
| 4,672,192 | 6/1987 | Muka | 372/31 |
| 4,679,057 | 7/1987 | Hamada | 346/76 L |

FOREIGN PATENT DOCUMENTS

| 56-083089 | 7/1981 | Japan . |
| 59-009086 | 2/1984 | Japan . |
| 59-130494 | 7/1984 | Japan . |
| 59-171037 | 9/1984 | Japan . |
| 60-035344 | 2/1985 | Japan . |
| 60-170041 | 9/1985 | Japan . |
| 60-192377 | 9/1985 | Japan . |
| 60-242527 | 12/1985 | Japan . |

Primary Examiner—E. A. Goldberg
Assistant Examiner—Mark Reinhart
Attorney, Agent, or Firm—Price, Gess & Ubell

[57] ABSTRACT

A laser recording apparatus for printing multi-tone image data by driving a laser diode according to levels of an analog signal containing the image data thereby to modulate a laser beam output by the laser diode, and causing the modulated laser beam to scan a recording medium in transverse directions. The output of the laser diode is stopped or reduced in level for a certain time in each of periods at predetermined intervals, each period corresponding to each pixel in the printed image. This eliminates mode hopping noise and optical feedback induced intensity noise, and hardly gives rise to the problem of electromagnetic wave disturbance. By elongating or shortening the time for stopping or reducing the emission by the laser diode (which time is shorter than the period corresponding to one pixel), the image density may be adjusted without impairing the above advantage.

17 Claims, 18 Drawing Sheets (a)  (b)

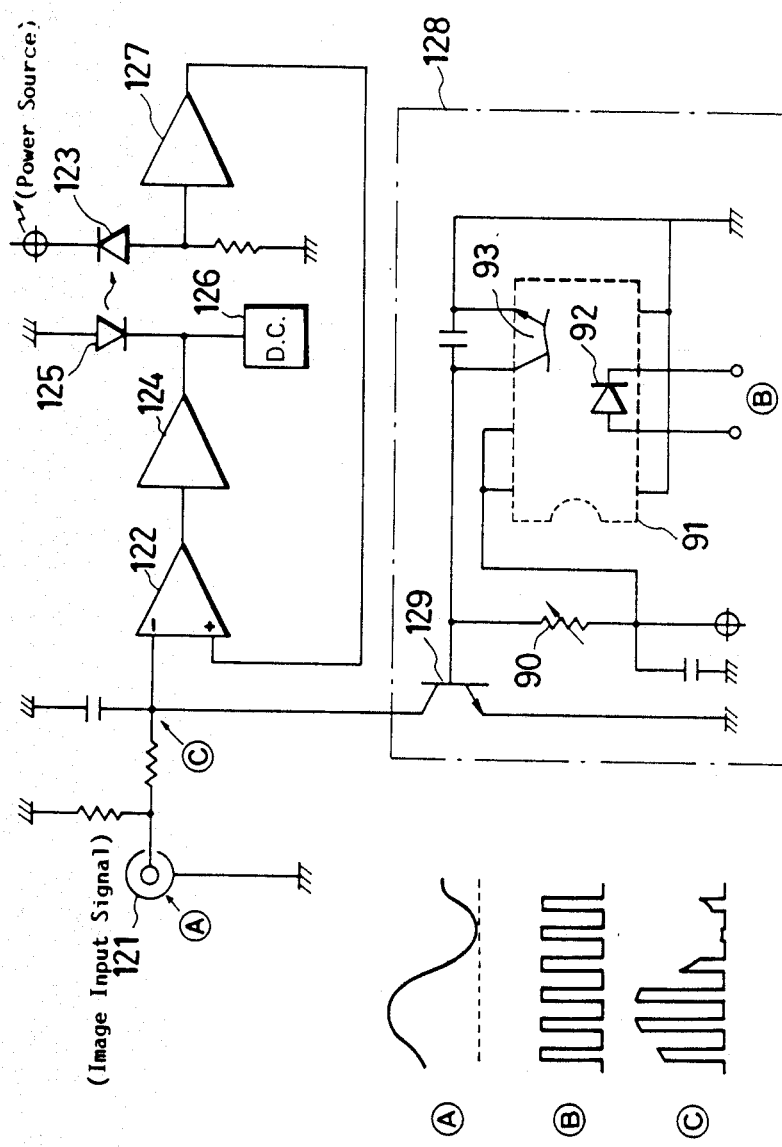

LASER RECORDING APPARATUS

BACKGROUND OF THE INVENTION

1. Field of the Invention

The present invention relates to a laser recording apparatus for printing image data on a recording medium by controlling an emission level of a laser diode according to the level of an image signal input.

2. Description of the Prior Art

It is well known that with a laser diode the output level of the laser beam may be modulated by modulating the electric current for driving the laser diode. A laser beam printer has been proposed which utilizes the above fact and carries out recording with tones by inputting image data in an analog signal to the laser diode, driving the laser diode, and controlling the output level of the laser diode.

Generally, such a laser beam printer employs a laser diode that emits a laser beam having a single wavelength since it is easy to converge the laser beam output by the laser beam. With the laser diode that emits a single wavelength laser beam, however, the emission wavelength is variable with even slight temperature variations, which results in noise known as mode hopping noise. The temperature and output level causing such noise vary from diode to diode even in the same lot. A further inconvenience is encountered where the laser diode is used as light source for the printer. In this case, light reflected by optical elements disposed on an optical path travels backward to cause periodic noise called optical feedback induced intensity noise. It is well known that the reflected light tends to amplify the mode hopping noise. The mode hopping noise and the optical feedback induced intensity noise markedly deteriorate the image quality of the printer.

To deal with these noises characteristic of the laser diode which provides a single wavelength emission, methods of superimposing a high frequency current of 500 MHz to 1 GHz (typically 700 MHz) on a direct current for driving the laser diode have been proposed in the Japanese patent publication No. 59-9086 and the Japanese patent applications laid open under Nos. 59-171037, 60-35344, 60-170041, 60-192377 and 56-83089.

According to the proposed technique, the laser diode is driven at the cycle of the high frequency current in such a way that the driving current for the laser diode is below the threshold level, thereby to periodically maintain a spontaneously emitting state wherein the laser diode emits in a wide wavelength region immediately before the laser emission.

The above prior art technique is based on the fact that, since the mode hopping noise and the optical feedback induced intensity noise are the phenomena attributable to the single wavelength emission of the laser diode, they may be eliminated by allowing the laser diode to emit light spontaneously in a wide wavelength region at a high frequency cycle. This technique is highly reliable with regard to stabilization of the laser diode output, but may produce only half of the intended effect depending on the construction of the laser diode used unless matching is effected with care. Furthermore, electromagnetic radiation noise can be produced unless a sufficient shielding treatment is provided for a high frequency wave generator and a laser diode light source portion.

The density adjustment for the above laser beam printer is conventionally carried out by rotating a beam splitter for example. FIG. 1 of the accompanying drawings illustrates a laser beam printer for which this method is executed. Reference number 1 indicates an analog input signal applied to a laser diode drive circuit 2, number 3 indicates a laser diode, and number 4 indicates a laser beam emitted from the laser diode 3 which is divided by a beam splitter 5 into an image forming beam 6 and a monitoring beam 7. The image forming beam 6 travels through a further beam splitter 8 and an optical system 9 to form an image on an image forming surface. The monitoring beam 7 is subjected to photoelectric conversion at an optical sensor 11 for negative feedback to the laser diode drive circuit 2.

The further beam splitter 8 is rotatable on an optical path. Assuming that the beam splitter 8 is rotated by an angle $\theta$ from an original position, the power of the laser beam which passes through the beam splitter 8 varies along a curve expressed by $\cos^2 \theta$ as shown in FIG. 2. This is because the transmission rate varies with the rotation of a polarization type beam splitter since the laesr diode has a P-polarized characteristic. The rotation of the beam splitter is controlled by software, and enables power range switching and density adjustment on the image forming surface.

The known density adjusting method noted above requires a mechanical device for rotating the beam splitter, and therefore gives rise to the problem of rusting and wear due to the material forming the mechanical device, environmental conditions and the like.

When the beam splitter is rotated by eccentricity, there arises the problem of displacing the optical axis and marring the image. This problem is notable particularly with the type of color laser beam printer which forms an image by superimposing a plurality of beams.

SUMMARY OF THE INVENTION

A primary object of the present invention, therefore, is to provide a laser beam printer effective for preventing the mode hopping noise and optical feedback induced intensity noise.

Another object of the invention is to provide a laser beam printer which hardly causes electromagnetic wave disturbances.

A further object of the invention is to provide a laser beam printer capable of density adjustment without rotation a beam splitter.

A still further object of the invention is to provide a laser beam printer adapted to print images free from disturbances.

In order to achieve these objects, a laser recording apparatus according to the present invention and adapted to modulate a laser beam level in accordance with a multi-tone image signal level and to cause a laser beam to scan a recording medium transversely, comprises a laser light source for generating the laser beam; drive means for driving the laser light source in accordance with the multi-tone image signal level so as to modulate the laser beam level; means for generating pulses for periods at predetermined intervals; means for outputting the multi-tone image signals to the drive means in response to the pulses; and means for reducing the laser beam level for a certain time in each of the periods.

Each of the periods noted above preferably corresponds to one pixel in the image. One pixel corresponds to one dot which is a minimum unit for forming the image. The period corresponding to one pixel cannot be determined to have a fixed length since it depends on the scanning speed of the laser beam, the sensitivity of a sensitive material and the like, but in terms of frequency it corresponds to several MHz.

The mode hopping noise and the optical feedback induced intensity noise may be drastically diminished by periodically reducing the level of the laser beam for a fixed time in each period corresponding to one pixel. Further, since the frequency corresponding to one pixel is a relatively low frequency in the order of several MHz, there arises no problem of electromagnetic wave disturbance. The frequency corresponding to one pixel is determine by the construction of the laser beam printer and not by individual laser diodes. Therefore, in principle, frequency adjustment is unnecessary and difficulties accompanying adjustment operations as in the prior art are now eliminated.

According to the present invention, the time for reducing the laser beam level may be varied when reducing the level for each period corresponding to one pixel. This will effect pixel by pixel variations in the average power of the laser beam projected to the image forming surface, thereby enabling to shift the image density on the recording medium.

BRIEF DESCRIPTION OF THE DRAWINGS

These and other objects or features of the present invention will become apparent from the following description of preferred embodiments thereof taken in conjunction with the accompanying drawings, in which:

FIG. 12 is a diagram showing another circuit for pulse-modulating the image signal, FIG. 16, 16b, 16c, and 16d are diagrams of waveforms of illustrating operation of the construction shown in FIG. 14.

DESCRIPTION OF THE PREFERRED EMBODIMENTS

Figure 3:
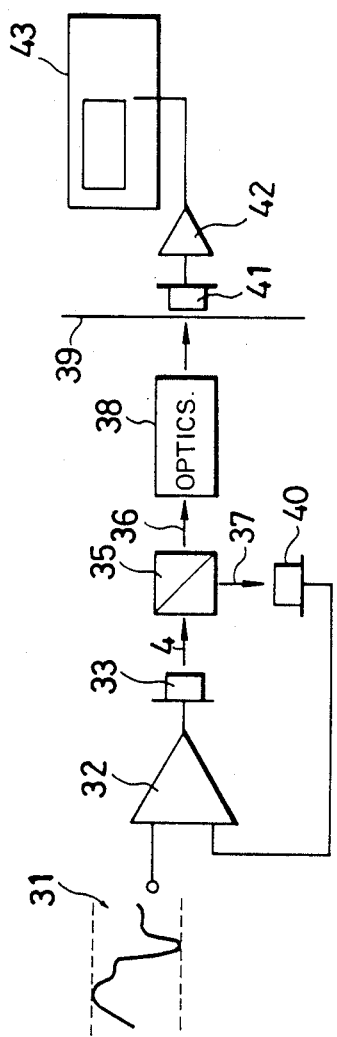
FIG. 3 is a diagram of a laser diode drive circuit for a laser beam printer for illustrating the principle of the present invention.

FIG. 3 is a diagram of a laser beam printer used for illustrating the principle of the present invention. Number 31 in FIG. 3 indicates an image signal input to a laser diode drive circuit 32, and number 33 indicates a laser diode. The laser diode 33 emits a laser beam which is divided by a beam splitter 35 into transmitted light 36 and reflected light 37. The transmitted light 36 travels through an optical system 38 to form an image on a sensitive materials 39, while the reflected light 37 is subjected to photoelectric conversion at an optical sensor 40 for negative feedback to the laser diode drive circuit 32. Number 41 indicates an optical sensor for detecting laser beam levels on the sensitive material 39. The optical sensor 41 outputs detection signals which proceed through an amplifier 42 to an oscilloscope 43 to be monitored.

Figure 1:
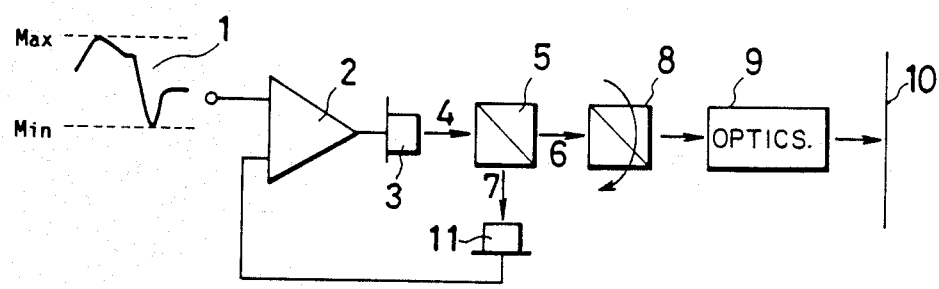
FIG. 1 is a diagram illustrating a conventional laser beam printer.
Figure 2:
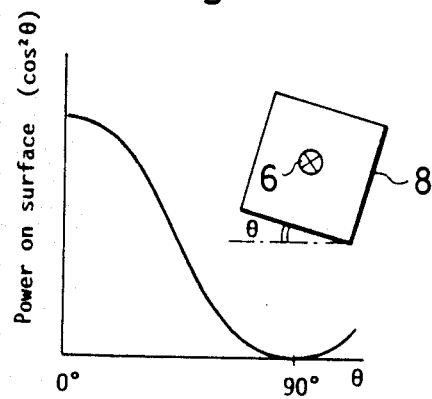
FIG. 2 is a diagram illustrating an angle of rotation of a beam splitter and an amount of laser beam transmission.
Figure 4:
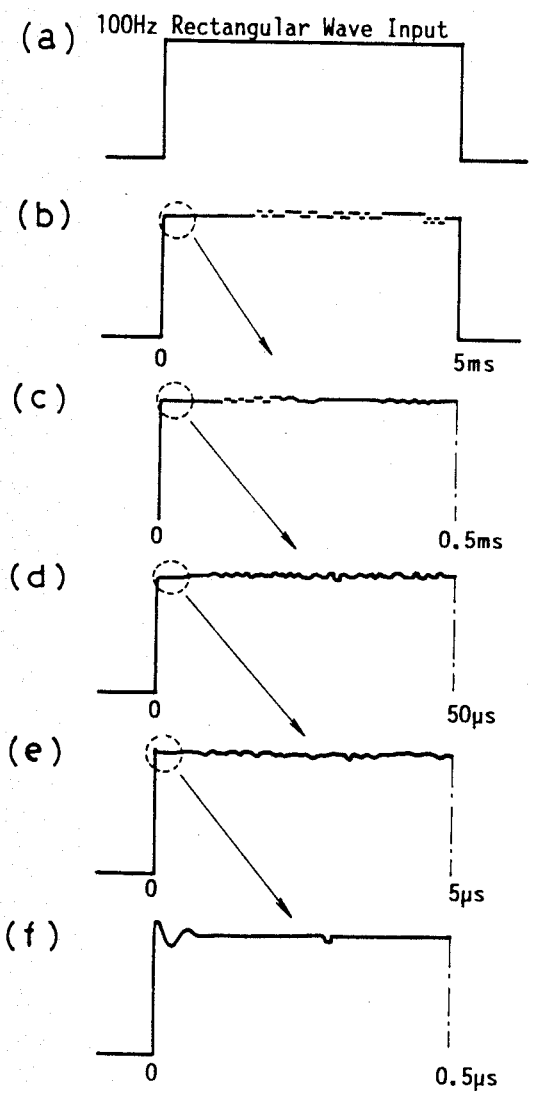
FIG. 4a, 4b, 4c, 4d, 4e, and 4f, are views of a waveform of a laser diode output occurring when a pulse signal is applied to the circuit of FIG. 3, FIG. 5a and 5b are views illustrating an image formed under the influence of mode hopping noise and an image formed free of such influence.

With this printer, a 100 Hz rectangular wave signal as shown in FIG. 4 (a) was applied in place of the analog image signal 31 and variations in the laser beam level on the sensitive material 39 were monitored with the oscilloscope 43. FIG. 4 (b) shows the results. This data was derived where the laser diode had a minimum emission power at zero milliwatt and a maximum emission power at 70% of maximum rating, and its ambient temperature was manually varied. It will be seen from FIG. 2 (b) that the laser beam level is not flat but is modulated at random. This random modulation is due to mode hopping noise, and tends to be caused by self-heating of the laser diode incidental to the light emission as well as by the variations in the ambient temperature and to be modulated by light returning from external optical elements. It has been found that a negative feedback circuit leading to the laser diode drive circuit 32 has the function to prevent the variations in the laser beam level, and is responsive to a frequency as high as about 20 MHz but is totally ineffective with regard to the mode hopping noise.

FIGS. 4 (c)-(f) progressively show a rise portion of the waveform of FIG. 4 (b) in tenfold magnifications on time basis. It will be seen from these figures that the beam level is to a large extent, if not entirely, free of the mode hopping noise for 0.5 microseconds after the rise of emission by the laser diode.

It follows, therefore, that the mode hopping noise may be prevented by stopping the laser beam emission at MHz order intervals in order to improve image quality. However, it has been confirmed through other experiments that a similar effect is produced by reducing the level of the input signal for the laser diode to a level corresponding to less than half of the maximum rating power for a short period instead of stopping the laser beam emission.

Figure 5:
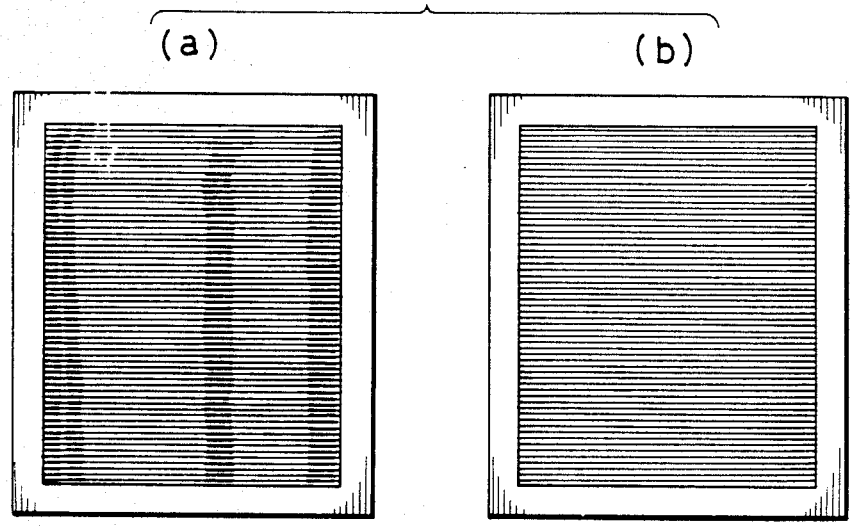

FIG. 5 illustrates samples of a constant density image printed with the laser beam printer. FIG. 5 (b) shows an ideal print, whereas FIG. 5 (a) shows unevenness in the density due to the mode hopping noise. FIG. 4 (a) and FIGS. 5 (b)–(f) illustrate that print patterns are closely related to the noise.

Thus, the mode hopping noise may be prevented by reducing the level of the laser beam output by the laser diode for a short period at intervals of MHz or more. However, the level must be reduced at intervals so as to correspond to each pixel. If the image signal level were reduced for one short period for two pixels, the laser beam level would be reduced while the laser beam is printing two dots in the image. This would inconveniently result in a difference in density between the two dots, one being printed during a time in which the beam level is reduced and the other during a time in which the beam level is not reduced. By reducing the level of the laser beam output by the laser diode for one short period for each pixel, such an inconvenience may be avoided and all dots will have the same density so long as the emission power is constant.

Figure 6:
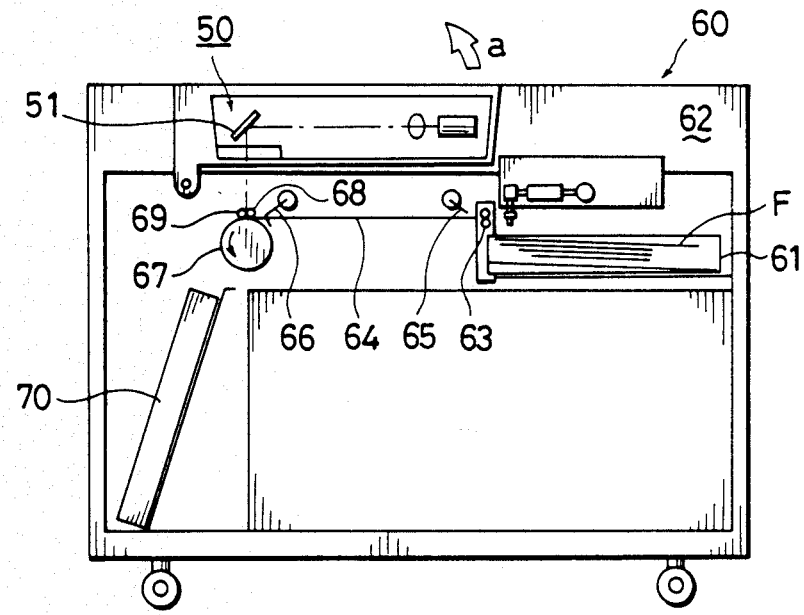
FIG. 6 is a schematic side elevation of a laser recording apparatus according to the present invention.

FIG. 6 is a schematic sectional view of an image recording apparatus according to one embodiment of the present invention. First, the construction and operation of the image recording apparatus will be described briefly with reference to this figure.

The image recording apparatus 60 is for printing toned images on photosensitive films F such as silver chloride films by means of a laser beam modulated according to an image signal level. The films F are placed one upon another in a supply cassette 61, and an uppermost one of the films F is picked up by a pickup mechanism 62 and is delivered by feed rollers 63 onto a film support plate 64. Thereafter the film F is fed between a drum 67 in constant counterclockwise rotation and press rollers 68, 69 in rotation through contact with the drum 67. While being transported, the film F is exposed to the laser beam between the rollers 68, 69. After the exposure the film F is allowed to fall into a discharge cassette 70.

The laser beam is projected to the film F between the rollers 68, 69 via a reflecting mirror 51 contained in an optical box 50 mounted in an upper portion of the image recording apparatus 60.

Figure 7:
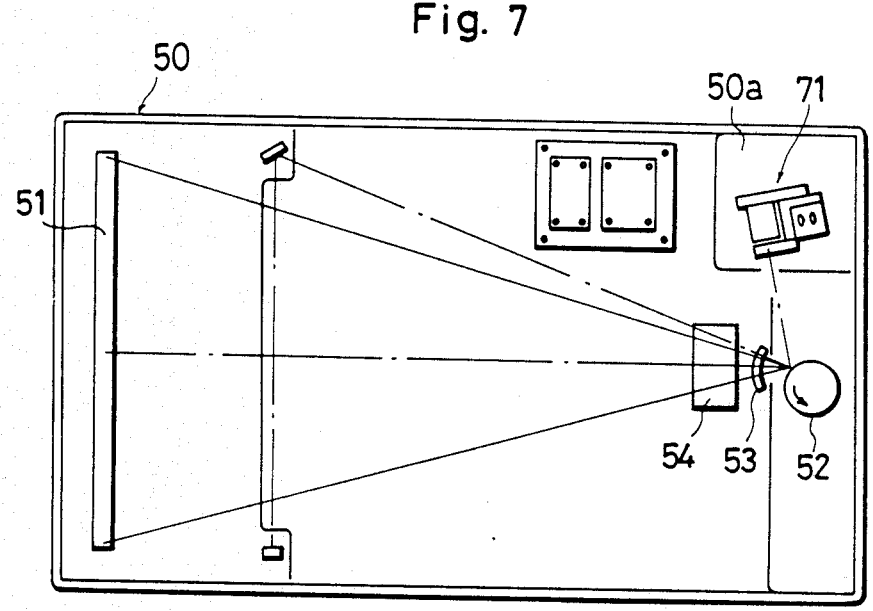
FIG. 7 is a plan view showing an arrangement of optical elements in an optical box in FIG. 6, FIG. 8a, 8b, and 8c are diagrams showing a laser diode drive circuit employed in a light source in FIG. 7, FIG. 9a and 9b are diagram showing waveforms of other signals usable for pulse-modulating an image signal.

FIG. 7 is a plan view showing the arrangement of optical elements in the optical box 50. The laser beam is emitted from a light source 71 while being modulated, and travels via a polygonal mirror 52 in high speed rotation, through a toroidal lens 53, an f0 lens 54 and the reflecting mirror 51 to write image data on the film F transported in synchronism therewith.

Figure 8:
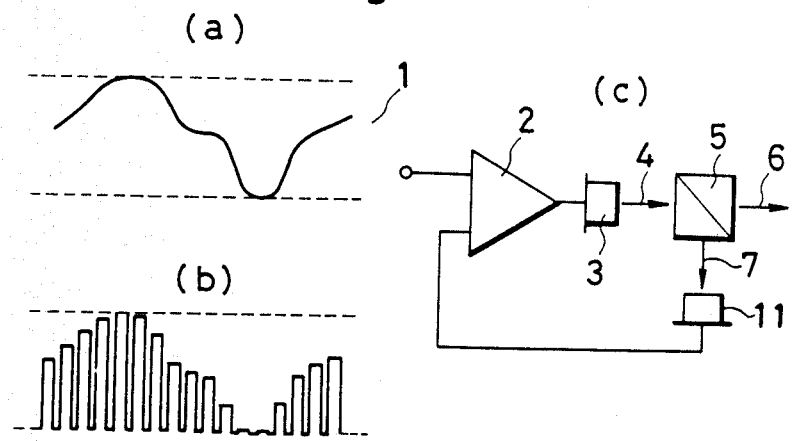

FIG. 8 shows a laser diode drive circuit incorporated into the light source 71 and having the same basic construction as shown in FIG. 3. The laser diode drive circuit 2 receives an image signal 1 pulse-amplitude-modulated by a suitable pulse modulation circuit, not shown, to assume pulses as shown in FIG. 8 (b). The pulse modulation frequency corresponds to one pixel in the image. Where, as here, the image signal is pulse-amplitude-modulated in the pulse waveform with a frequency corresponding to one pixel, the image is reproduced with a tone density proportional to a pulse height.

Figure 9:
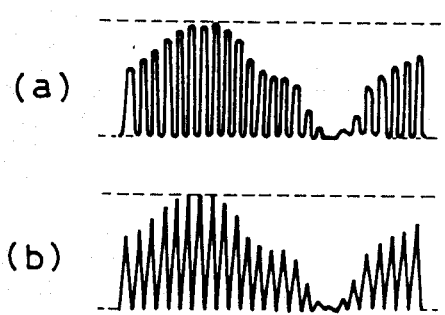
Figure 10:
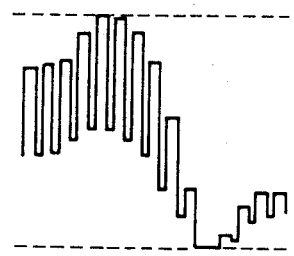
FIG. 10 is a diagram showing various depths of pulse modulation.

The image signal may be modulated into other waveforms such as a sine waveform and a triangular waveform as shown in FIGS. 9 (a) and (b). Furthermore, the pulse-amplitude-modulation may involve reduction only to half level of the image signal as shown in FIG. 10, instead of reduction to zero level. The frequency of mode hopping occurrence vaires with the temperature and emission power of the diode and also from diode to diode. Therefore, low levels in the modulated image signal basically correspond to the levels resulting from stoppage of emission by the laser diode. However, since the mode hopping noise is notable when the power of the laser diode is above half of the maximum rating power, the mode hopping noise may be prevented by setting the low levels below half of the maximum value of the modulated signal as shown in FIG. 10.

Figure 11:
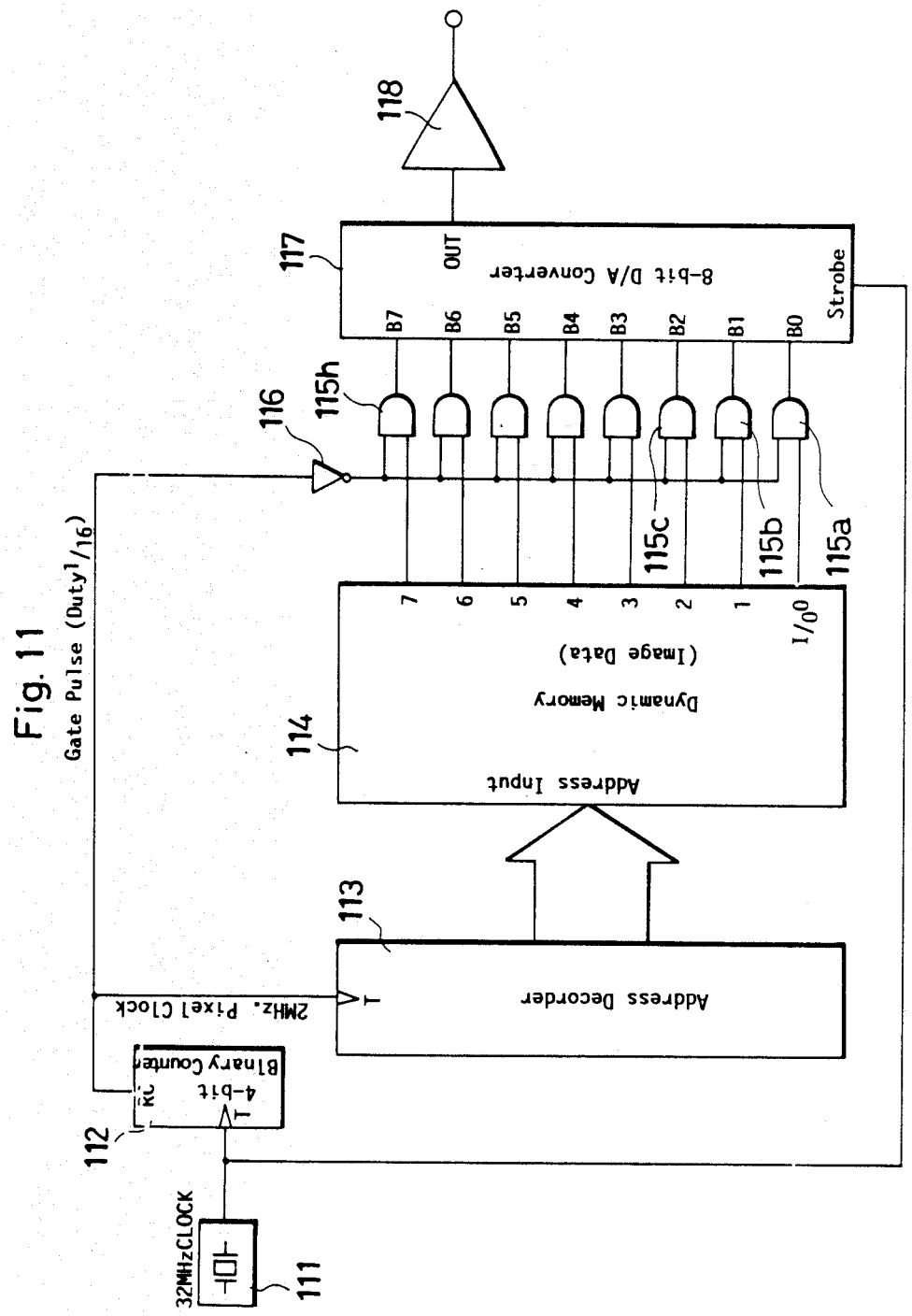
FIG. 11 is a diagram showing a specific circuit for pulse-modulating the image signal.

FIG. 11 shows a specific example of a circuit for pulse-amplitude-modulating the image signal. This circuit is adapted to output an image of 256 tones by means of 8-bit image data. Number 111 indicates, for example, a 32 MHz clock pulse generator and number 112 indicates a 4-bit binary counter acting as frequency divider. The clock pulse generated by the clock pulse generator 111 is divided by this frequency divider to 1/16, thereby to produce 2 MHz pulses (pixel clock) suitable as the frequency corresponding to one pixel. Number 113 indicates an address decoder, number 114 is a dynamic memory for storing the image data in binarized form, numbers 115a–115h indicate AND gates, number 116 indicates an inverter, number 117 indicates a D/A converter, and number 118 indicates an amplifier whose output is given to the laser diode drive circuit 2 as shown in FIG. 8.

According to the above construction, image data of the address designated by the address decoder 113 is read from the dynamic memory 114 in synchronism with the 2 MHz pixel clock, and is input to the AND gates 115a–115h which are opened and closed by the pixel clock. The gates provide zero output data when closed, and therefore the image signal after D/A conversion becomes zero level then. Accordingly, the pulse-amplitude-modulation is carried out on the image signal by opening and closing of the AND gates. In this embodiment, the gates 115a–115h are closed for the period of 1/16 after the start of each dot in the image.

In FIG. 11, the frequency of 2 MHz is employed for each pixel but of course this is not limitative.

FIG. 12 shows another example of a circuit for pulse-amplitude-modulating the image signal. The image signal A is input at an input terminal 121, compared by a comparator 122 with a feedback signal transmitted from a light receiving element 123 by a comparator 122, and amplified by an amplifier 124 to drive a laser diode 125. Number 126 indicates a D.C. bias current source for the laser diode which emits the laser beam for forming an image, and number 127 indicates an amplifier for amplifying the signal from the light receiving element 123.

The circuit for pulse-modulating the image signal A is indicated at 128. This circuit 128 includes a transistor 129 for turning the image signal on and off, a variable resistor 90 for varying a threshold level for the operation of transistor 129, and a photocoupler 91 for actuating the transistor 129. The photocoupler 91 optically couples a light emitting diode 92 and a light receiving element 93. The diode 92 is operable under control by a signal provided by a CPU (which signal is of pulse waveform having a fixed duty ratio as shown at B in FIG. 12). When the signal B rises, the diode 92 emits light which places the light receiving element 93 in the operative state. Then the base of transistor 129 switches to ground potential and the emitter and collector of transistor 129 are unelectrified. Therefore the image signal A is input to a negative input terminal of comparator 122 in consequence causing the laser diode 125 to emit light in a quantity corresponding to the level of the image signal A. Conversely, when the diode 92 stops emitting light, the transistor 129 becomes operative. Then the negative terminal of comparator 122 changes into ground potential so that laser diode 125 stops the emission.

Where the light emitting diode 92 is turned on and off with the signal B, the image signal A is modulated to have a waveform as shown at C in FIG. 12. It will be seen clearly that the image signal is turned on and off in synchronism with the action of the light emitting diode 92. The frequency of the on-off operation of the light emitting diode 92 must be a frequency corresponding to one pixel. Therefore, the signal B rises and falls in a short time of about 30 nanoseconds, and it is necessary for the photocoupler 91 to be a high speed photocoupler usable in such a frequency.

Figure 13:
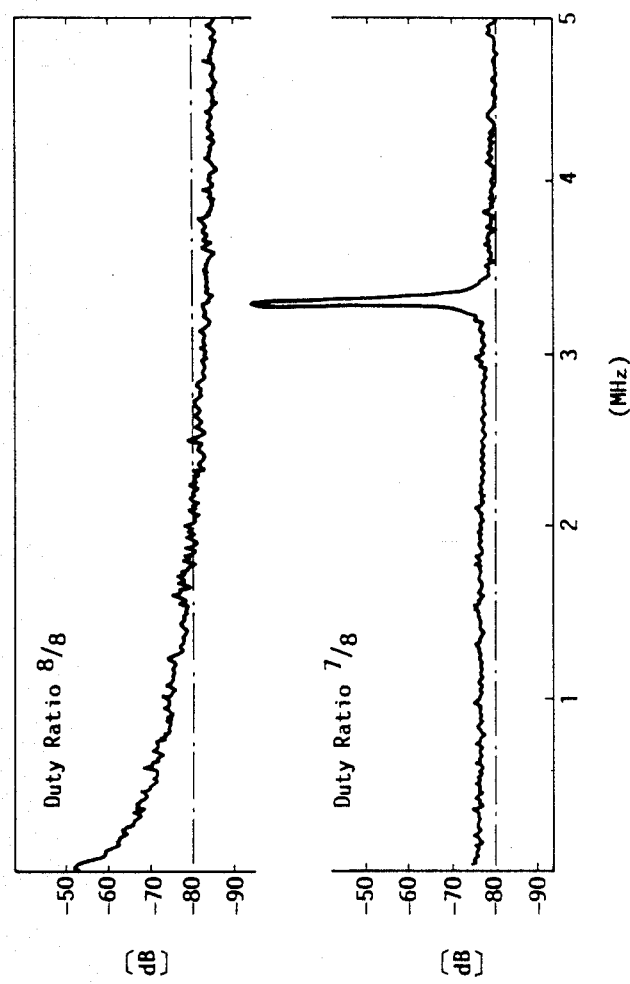
FIG. 13a, 13b, and 13c are views showing results of examination as to the time and level of laser beam reduction necessary to stabilization of laser diode output, which were derived by means of noise spectrum.
Figure 13:
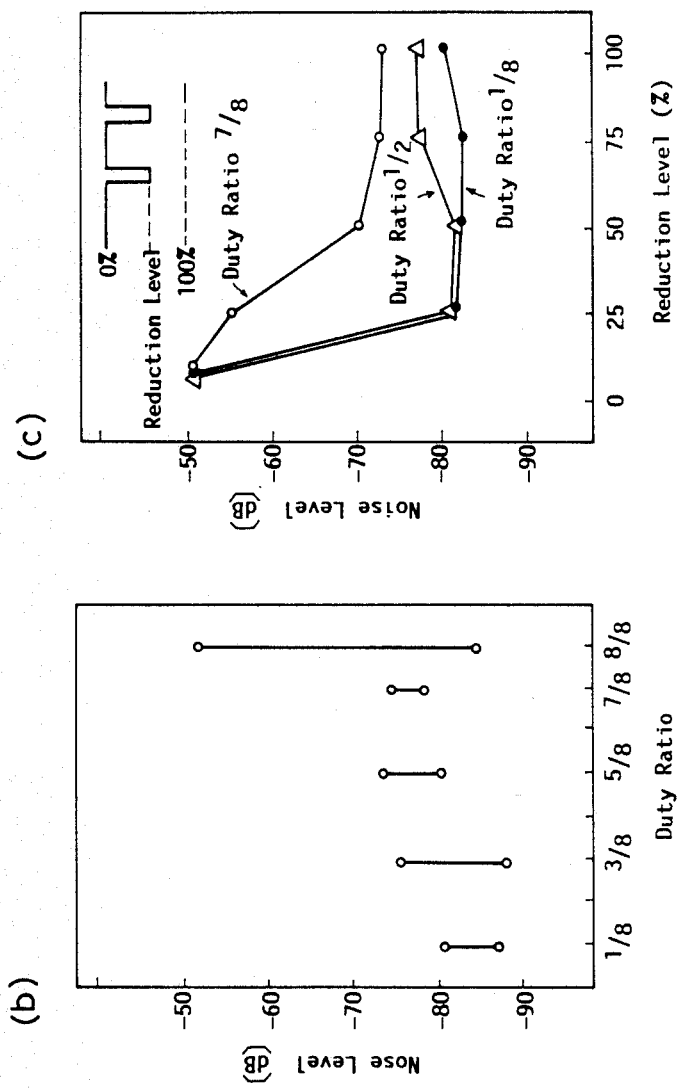

FIG. 13 shows results of an examination as to the time and level of laser beam reduction necessary to stabilization of the laser diode output, which were derived by means of a noise spectrum. This figure has been plotted by utilizing a spectrum analyzer in place of the oscilloscope of FIG. 3. The level reduction time represents a duty ratio of the light emission time of the laser diode to one pixel clock. FIG. 13 shows the results of examination in respect of a laser diode having a 780 nm emission wavelength and a 20 mW maximum rating, and its maximum emission level is 75% of the maximum rating ridden with noise.

The emission frequency of the laser diode (hereinafter referred to as pulsing frequency) was set to about 3.3 MHz, and the emission duty ratio was varied by $\frac{1}{8}$. FIG. 13 (a) shows data of the duty ratios $\frac{1}{8}$ and 8/8. The data of the duty ratio $\frac{1}{8}$ shows a sharp peak at 3.3 MHz corresponding to the pulse frequency. The duty ratio 8/8 represents a constant power emission without pulsing. The spectrum was measured over a range extending to 5 MHz to cover the 3.3 MHz clock pulse frequency. The axis of ordinate indicates the levels of the signal and noise in decibels and includes a −80 dB line for reference. It will be seen from FIG. 13 (a) that there is a distinct difference between thd duty ratios $\frac{1}{8}$ and 8/8. To be particular, in the duty ratio $\frac{1}{8}$ the level is flat throughout the spectrums whereas in the duty ratio 8/8 the level reaches to a maximum value as high as 30 dB in a low frequency band below 1 MHz. FIG. 13 (b) is a diagram plotted by extracting maximums and minimums of the noise spectrum in a range up to the clock pulse frequency and setting them in relation to the emission duty ratios. It will be seen from FIG. 13 (b) that the pulsing emission produces a considerable effect on the noise spectrum, though shown in ratio variations by $\frac{1}{8}$. As inferred from FIG. 13 (a), the spectrum has the noise level in the low frequency band reduced to be flat with respect to the frequency. In FIGS. 13 (a) and (b), when the level of the light emission by the laser diode is reduced in the pulsing frequency, the level is reduced to zero (that is to say the emission is stopped). FIG. 13 (c) shows results of examination as to the level to which the light emission may be reduced to produce the same effect. In FIG. 13 (c) maximum values of the noise spectrum are plotted by standardizing them by the ratio of the reduction level with respect to the level without pulses (which is set to the maximum rating power) and varying the pulsing duty ratio. It will be seen from FIG. 13 (c) that a sufficient effect is produced without reducing the emission level by 100% if the emission level is reduced by 25% or more with the pulsing duty ratio at $\frac{1}{2}$ or less and by 50% or more with the pulsing duty ratio exceeding $\frac{1}{2}$.

Figure 14:
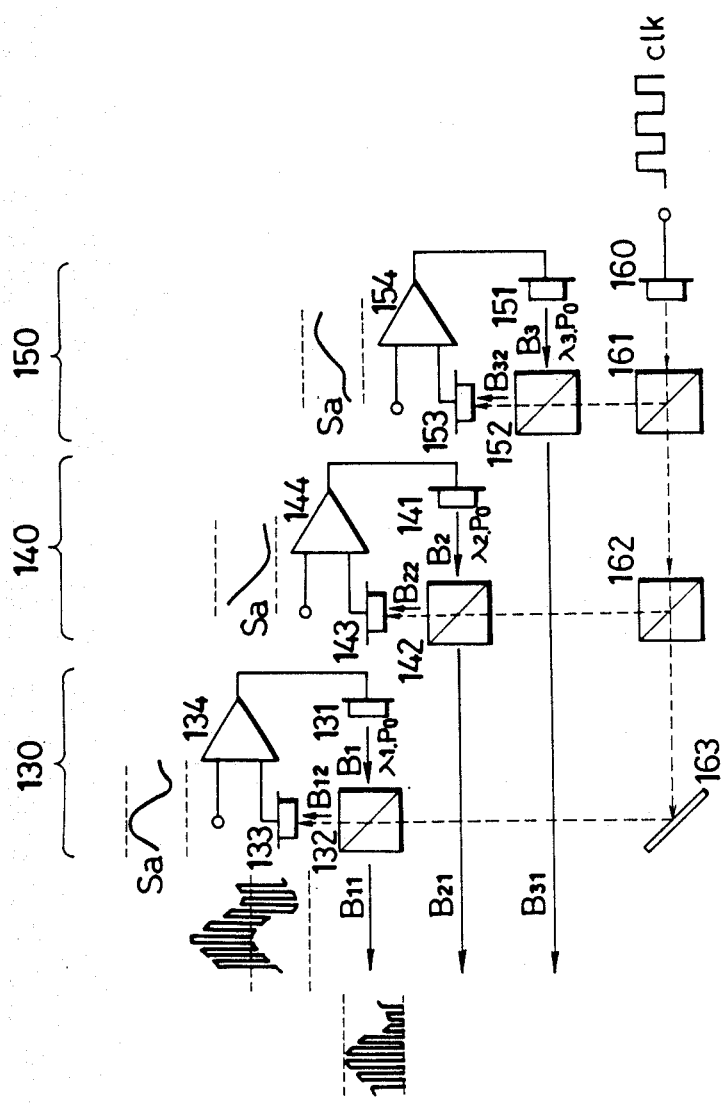
FIG. 14 is a diagram showing a further embodiment of the invention as applied to a color laser printer.

FIG. 14 illustrates a laser diode drive system for a color laser printer wherein the pulsing duty ratio is set to the range described above. This system comprises three drive sections 130, 140 and 150. The drive sections 130, 140 and 150 include laser diodes 131, 141 and 151, polarizing beam splitters 132, 142 and 152 for dividing laser beams B1–B3 into image forming beams B11, B21 and B31 and monitoring beams B12, B22 and B32, optical sensors 133, 143 and 153 for receiving the monitoring beams B12, B22 and B32, and amplifiers 134, 144 and 154 for driving the laser diodes 131, 141 and 151, respectively.

The laser diodes 131, 141 and 151 have different emission wavelengths $\lambda a$, $\lambda 2$ and $\lambda 3$, and a uniform maximum emission power PO which is 20 mW, for example. Each laser diode has a photoactive layer disposed horizontally.

Figure 15:
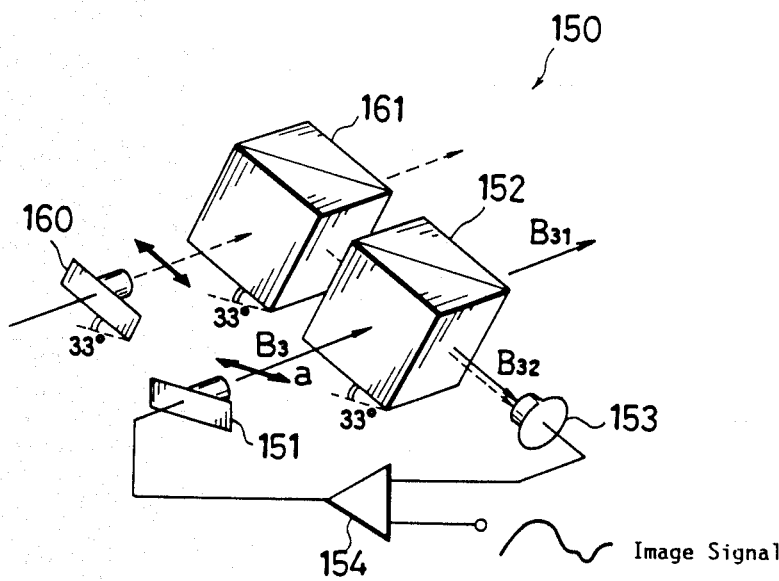
FIG. 15 is a view showing how a deflecting beam splitter is disposed.

As shown in FIG. 15 (which shows only the third drive section to represent the other drive sections), the polarization type beam splitters 132, 142 and 152 are inclined at an angle of 33 degrees relative to the horizontal plane, for example. Since the laser diodes have the photoactive layers disposed horizontally, the ratio of the image forming beams B11, B21 and B31 to the monitoring beams B12, B22 and B32 is determined by the inclination angle to the horizontal plane of the polarization type beam splitters 132, 142 and 152. If the polarization type beam splitters 132, 142 and 152 were disposed horizontally, all the beams from the laser diodes would be transmitted therethrough. If the polarization type beam splitters 132, 142 and 152 were disposed at an angle of 90 degrees relative to the horizontal plane, almost all the beams would be reflected. The ratio of transmitted beams to reflected beams is 7:3 where, as in this embodiment, the polarizing beam splitters are inclined 33 degrees.

The optical sensors 133, 143 and 153 used herein have a relatively flat radiation sensitivity with respect to wavelength. Therefore, although the laser diodes 131, 141 and 151 have the different emission wavelengths $\lambda 1$, $\lambda 2$ and $\lambda 3$, the sensitivity varies within a ±10% range among the emission wavelengths $\lambda 1$, $\lambda 2$ and $\lambda 3$ assuming that the sensitivity at a middle wavelength is 100%.

The amplifiers 134, 144 and 154 each include two input terminals, one of which receives an image signal Sa containing image data and the other receives a monitor signal as a negative feedback signal from the optical sensor 133, 143 and 153.

In addition to the laser diode drive sections 130, 140 and 150, the above printer includes a reference laser diode 160, beam splitters of the wavefront dividing type 161 and 162 for reflecting part of the laser beam emitted from the laser diode 160, and a reflecting mirror 163 for reflecting the entire laser beam which passes through the beam splitters 161 and 162.

The reference laser diode 160 is driven by a printer clock signal clk having a frequency corresponding to one pixel in the image, to effect a digital mode emission. As shown in FIG. 15, the reference laser diode 160 is inclined at an angle of 33 degrees relative to the horizontal plane, which corresponds to the rotation angle of the polarization type beam splitters 132, 142 and 152 of the laser diode drive sections 130, 140 and 150.

The beam splitters of the wavefront dividing type 161 and 162 are positioned and angled (33 degrees) such that the beams reflected thereby will proceed to the polarization type beam splitters 141, 152 of the second and third laser diode drive sections 140, 150. The reflecting mirror 163 is disposed such that the beam reflected thereby will proceed to the polarization type beam splitter 132 of the first laser diode drive section 130.

The reference laser diode 160 is inclined at an angle of 33 degrees relative to the horizontal plane as described above, in order to prevent reflection at each of the polarization type beam splitters 132, 142 and 152. If the reference laser diode 160 included a photoactive layer having an angle of inclination not corresponding to that of the polarizing beam splitters 132, 142 and 152, part of the laser beam emitted by the reference laser diode 160 would be reflected by the polarization type beam spliters 132, 142 and 152 to mix into the image forming beams B11, B21 and B31, thereby resulting in noise in the formed image. Where, as in this embodiment, the photoactive layer of the reference laser diode 160 is parallel to the polarization type beam splitters 132, 142 and 152, the laser beam emitted by the reference laser diode 160 is all superimposed on the monitoring beams B12, B22 and B32 whereby no noise occurs on the formed image.

Figure 16:
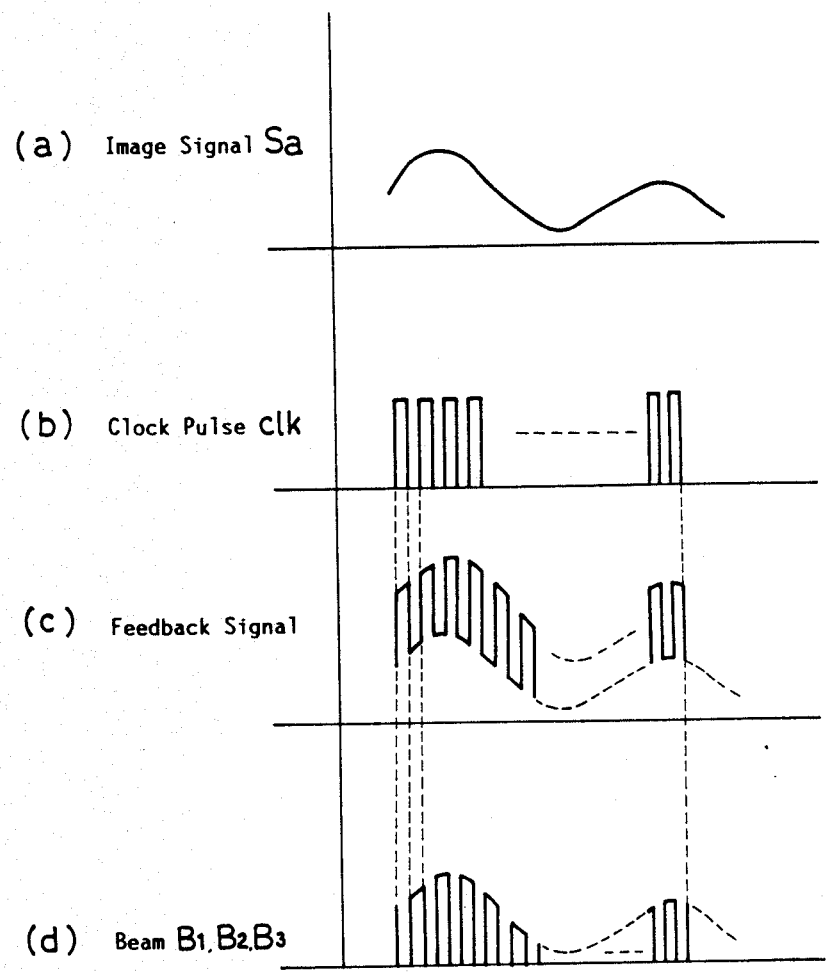

Since the laser diodes 131, 141 and 151 are driven by the image signal Sa, the monitoning beams B12, B22 and B32 have a waveform similar to the waveform of the image signal as shown in FIG. 16 (a). Such monitoring beams B12, B22 and B32 are superimposed, the laser beam which is digitally emitted by the reference laser diode 160 (which has a waveform as shown in FIG. 16 (b)) to assume a waveform as shown in FIG. 16 (c). Hereinafter the laser beam which is digitally emitted by the reference laser diode 160 is called a reference light. Feedback signals having such a waveform are input to the amplifiers 134, 144 and 154 and subjected to differential amplification with the image signal Sa. Therefore, the outputs of the amplifiers 134, 144 and 154 or the laser beams B1-B3 are in a pulse driven state as shown in FIG. 16 (d).

In this case, the duty ratio of the laser beams B1-B3 is complementary to the duty ratio of the clock pulses clk applied to the reference laser diode 160. Thus, when the duty raito of the clock pulses clk is 30%, the duty ratio of thelaser beams B1-B3 is 70%. The power of the beam, whic is emitted by the reference laser diode 160 and is superimposed on the monitor beams B11, B12 and B32, is determined according to conditions of the pulse drive mode illustrated in FIG. 13 (c). Where, for example, the beam from the reference laser diode 160 has a ½ (50%) duty ratio, the beam power may be 25% or more, preferably 50% or more, of the light quantity of monitor beams B11, B12 and B32. A specific example where the beam has a 50% duty ratio is shown in Table 1.

TABLE 1

| greater wave-lengths | wave-lengths | power rating Po | maximum emission power P = η × Po | monitoring light power M = 30% × P | reference light maximum power 50% × M |
|---|---|---|---|---|---|
| ↓ | 1 | 20 mW | 10 mW | 3.0 mW | 1.5 mW |
| ↓ | 2 | 20 | 10 | 3.0 | 1.5 mW |
| ↓ | 3 | 20 | 12 | 3.6 | 1.5 mW |
| | | | | total | 4.8 mW |

In the above table, λ represents a coefficient of conversion from power rating Po to a maximum power level at acutral driving times. This coefficient λ is dependent on the optical system efficiency at various wavelengths (including the 70% transmission rate of the beam splitters), the sensitivity of the sensitive material, the duty ratio of pulsing (½), the reduction level (50%) and so forth. It will be seen from this table that the reference laser diode 160 having a power of about 5 mW permits pulsing with the 50% reduction level to be carried out for the three laser diode drive sections 130, 140 and 150. The laser diode of 5 mW power may comprise an inexpensive diode, which is advantageous in terms of the cost of the apparatus.

Where it is difficult to provide the 33 degree inclination for the reference laser diode 160, the beam splitters of the wavefront dividing type 161 and 162 and reflecting mirror 163 as in the described embodiment, the reflected beams of the reference laser diode 160 traveling toward an image forming surface may be minimized thereby permitting the reference laser diode 160, beam splitters 161 and 162 and reflecting mirror 163 to be erected. In this case, at least the beam slitters 132, 142 and 152 of the drive sections 130, 140 and 150 are erected to assume a wavefront dividing type with respect to oscillating directions (shown by an arrow a in FIG. 15) of the electric fields of the laser diodes, and a divisional ratio is selected to be 80% for transmission and 20% for reflection. Further, the oscillation wavelength of the reference laser diode 160 is selected to correspond to the minimum sensitivity of the sensitive material (which is λ3). Table 2 shows specifications for providing the same image forming energy as in Table 1 by erecting the reference laser diode 160 and the others.

TABLE 2

| greater wavelength | wave-lengths | power rating Po | maximum emission power P = η × Po | monitoring light power M = 30% × P | reference light maximum power D = 50% × M | power of digital beam proceeding toward image-forming surface 20% × D |
|---|---|---|---|---|---|---|
| ↓ | 1 | 20 mW | 8 mW | 1.6 mW | 1.0 mW | 0.2 mW |
| ↓ | 2 | 20 | 9 | 1.8 | 1.1 mW | 0.22 |
| ↓ | 3 | 20 | 12 | 2.4 | 1.5 mW | 0.3 |
| | | | | total | 3.6 mW | 0.72 mW |

It will be seen from this table that the reference laser diode may have a small power not exceeding 4 mW. Since the duty ratio if ½, the total power of the referece diode output directed toward is 0.72 mW/2 =0.36 mW. This value, in combination with the reference light frequency being in the vicinity of λ3, will not create fogging on the sensitive material.

Figure 17:
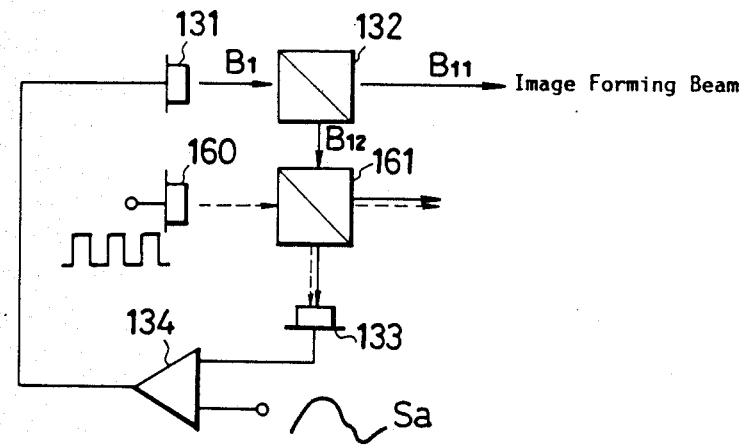
FIG. 17 is a view showing a partial modification of the construction shown in FIG. 14.

FIG. 17 shows a further embodiment of the present invention in which the reference beams are allowed to travel toward the image forming surfaces without inclining the reference laser diode 160 and beam splitters 161 and 162. In this embodiment, the beam splitter 161, which divides the beam emitted by the reference laser diode 160 into a transmitted beam and a reflected beam, is mounted on the optical path of the monitor beam B12. Though not shown, other laser diode drive sections 140 and 150 also include beam splitters on the optical paths of the monitor beams for dividing the reference beam. According to this construction, part of the monitor beam B12 is reflected if the beam splitter 161 for dividing the reference beam comprises a wavefront dividing beam splitter, thereby reducing the quantity of light incident on the optical sensor 133. Therefore, this construction may be employed where a large quantity of light (about 50%) is reflected by the beam splitter 132, namely where the power of light directed to the image forming surface may be about half.

Figure 18:
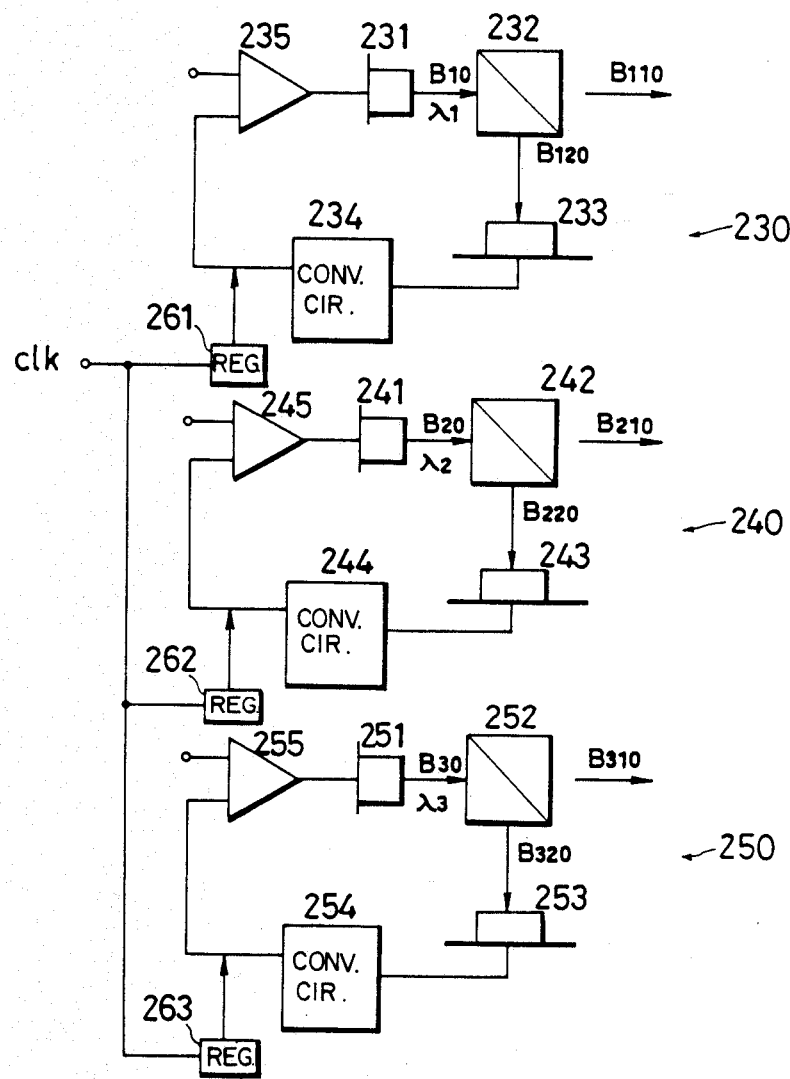
FIG. 18 is a diagram showing a still further embodiment of the invention as applied to a color laser printer.

FIG. 18 shows a still further embodiment of the present invention. In the embodiment of FIG. 14, the reference laser diode is utilized to optical superimpose the clock pulses on the feedback signals for the printer laser diodes. The embodiment of FIG. 18 employs an electric superimposition method. Like the apparatus of FIG. 14, this apparatus comprises three drive sections 230, 240 and 250. The drive sections 230, 240 and 250 include laser diodes 231, 241 and 251 having different wavelengths λ1, λ2 and λ3, beam splitters 232, 242 and 25 for dividing laser beams B10, B20 and B30 into image forming beams B110, B210 and B310 and monitoring beams B120, B220 and B320, optical sensors 233, 243 and 253 for receiving the monitoring beams B120, B220 and B320, photoelectric conversion circuits 234, 244 and 254 for processing and feeding back signals received from the optical sensors 233, 243 and 253, and amplifier circuits 235, 245 and 255 for driving the laser diodes 231, 241 and 251, respectively.

Though the laser diodes 231, 241 and 251 have different oscillation wavelengths λ1, λ2 and λ3, they have a uniform maximum emission power PO which is 20 mW, for example. Each laser diode normally has a photoactive layer disposed horizontally.

The photoelectric conversion circuits 234, 244 and 254 comprise known circuits for waveform-shaping and amplifying the signals received from the optical sensors. Clock pulses clk each corresponding to one pixel in the image are applied to output sides of the photoelectric conversion circuits through level regulating circuits 261, 262 and 263. Each level regulating circuit effects impedance matching, clock pulse amplitude adjustment and D.C. bias adjustment of the clock pulses. These circuits 261, 262 and 263 set the level of the clock pulses for superimposition on the monitor signals so as to satisfy the requirements for laser diode stabilization explained in connection with the pulsing drive and with reference to FIG. 13.

Figure 19:
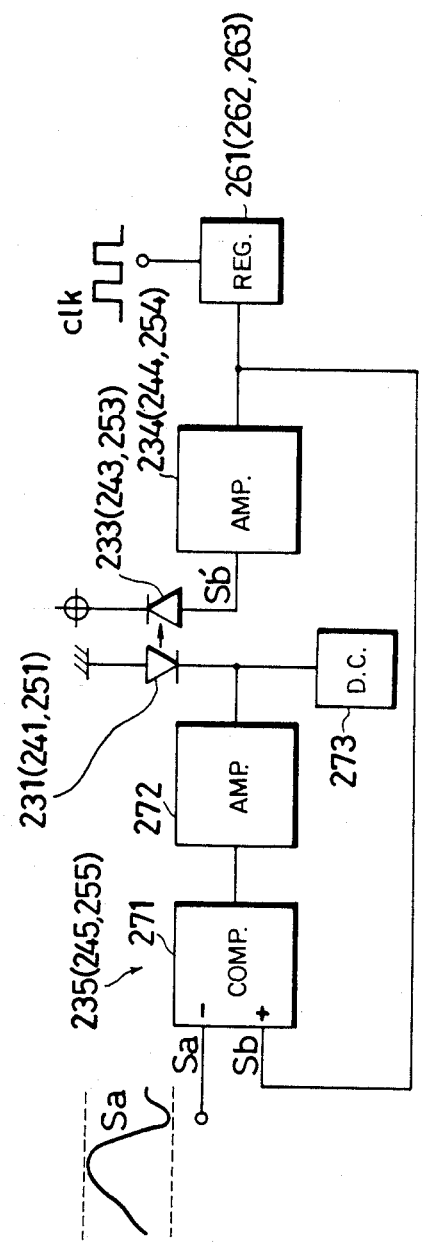
FIG. 19 is a diagram showing details of a portion of the construction shown in FIG. 18, FIG. 20a, 20b, and 20c are diagrams of waveforms for illustrating operation of the construction shown in FIG. 18, FIG. 21a and 21b show graphs representing a relationship between an image signal and an average light power on an image forming surface where a clock pulse duty ratio is varied or a bias is adjusted.

As shown in FIG. 19, each of the amplifier circuits 235, 245 and 255 in this embodiment includes a comparison amplifier circuit 271, a current amplifier circuit 272 and a D.C. source 273. The comparison amplifier cirucit 271 contains a high rate amplifier, and receives the image signal Sa at a reversible input terminal and the output of the photoelectric conversion circuit 234, 244 or 254 at a nonreversible input terminal. The current amplifier circuit 272 acts to amplify a current output by the comparison amplifier circuit 271 and corresponding to the image signal Sa to a level necessary for driving the laser diodes 231, 241 or 251. The D.C. source 273 supplies a direct current to the laser diode 231, 241 or 251 in order to improve responsivity to the light emission of the laser diode. This current supplied by the d.c. source 273 is aimed at a threshold current of each laser diode for expediency, but is variable to cope with an increase of the threshold current with passage of time, application of the laser printer and so on.

The case of inputting clock pulses of ½ duty ratio, for example, to the level regulating cirucit 261 will be described. Where the duty ratio is ½, the pulsing drive required the level reduction of laser beam emission to be 50% or less of the monitor signal level.

Figure 20:
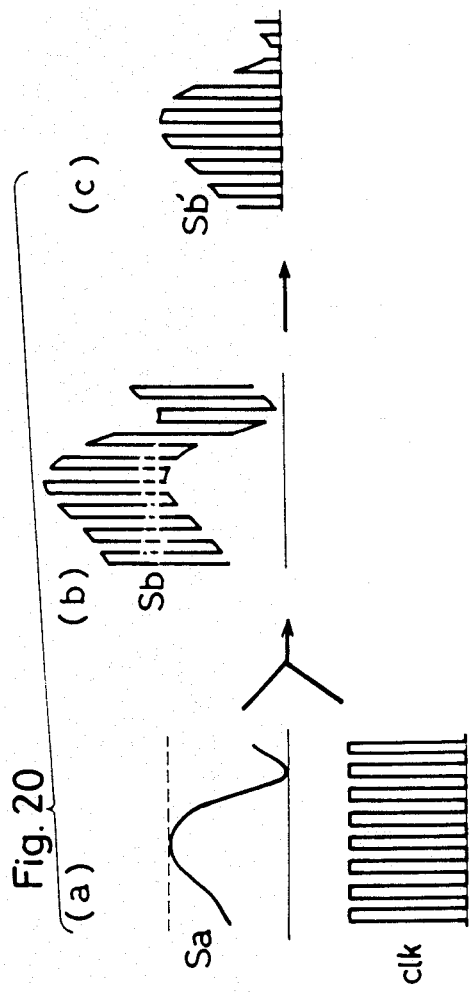

The case of adjusting the amplitude of the clock pulses to a maximum value of the monitor signal by the level regulating cirucit 261 for superimposition on the monitor signal will be described with reference to FIGS. 20 (a)–(c). In the drawings, reference Sa indicates a monitor signal not superimposed with the clock pulses, and reference clk indicates level-regulated clock pulses. By superimposing the clock pulses clk on the signal Sa, each photoelectric conversion circuit 233, 243 or 253 in prinicple outputs a signal as indicated at Sb. Since the two signals are superimposed, this resulting signal Sb has a level exceeding a power-regulated level. Therefore, the signal Sb is fed back to be compared with the analog signal Sa and reduced by an excess amount. As a result, the monitor signal received from each optical sensor 232, 242 or 252 has a form as indicated at Sb'. Since this monitor signal Sb' corresponds to part of the beam output by the laser diode 231, 241 or 251, the beam output by the laser diode has a pulse form as indicated at Sb'.

Figure 21:
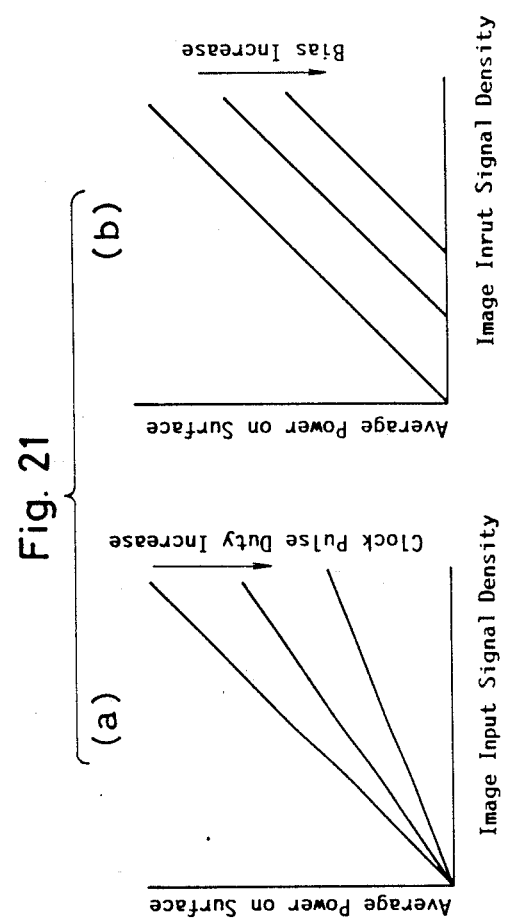

The duty ratio of the beam output by the laser diode is complementary to that of the clock pulses. Thus, when the duty ratio of the clock pulses clk is 30% for example, the duty ratio of the beam is 70%. Conversely, when the duty of the clock pulses clk is 70%, the duty of the beam is 30%. Where the duty ratio of the clock pulses varies, the average value of the emission power received by the image forming surface of the sensitive material may be varied as shown in FIG. 21 (a). In other words, such variation of the duty ratio shifts the image density on the image forming surface because the image density depends on the average value of the emission power. Where the duty ratio is fixed, the average value of the emission power may also be varied by means of bias regulation (or amplitude regulation) at the level regulating circuit 261, 262 or 263 as shown in FIG. 21 (b). Therefore, a combination of such factors may achieve a desired emission power according to the sensitivity of the sensitive material.

Figure 22:
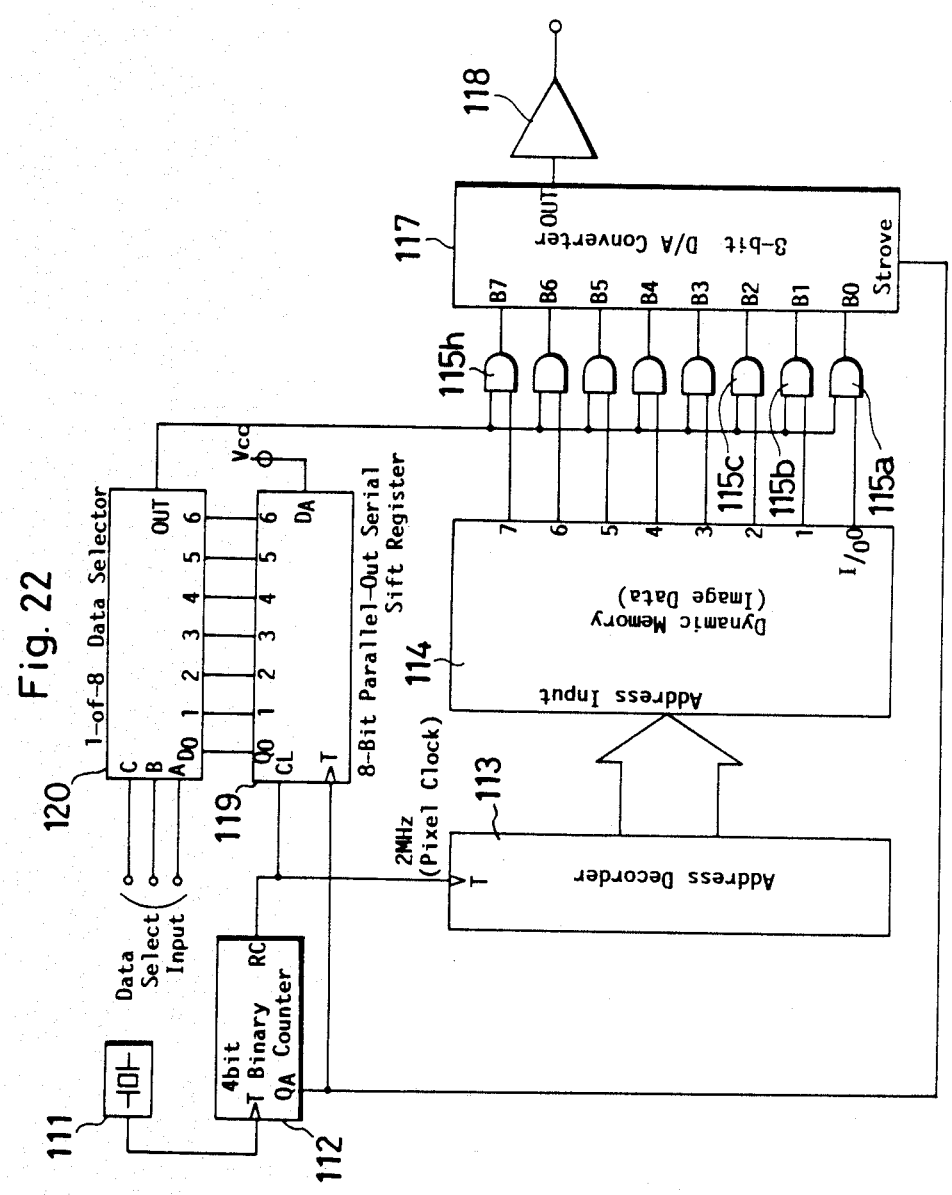
FIG. 22 is a diagram of a circuit for density regulation.

FIG. 22 show a circuit incorporated into the apparatus of FIG. 8 for regulating image density. This circuit is a modification of the pulse modulation circuit of FIG. 11, and like references are affixed to like circuit elements. The circuit of FIG. 22 differs from the circuit of FIG. 11 in that the inverter 116 is excluded and an 8-bit parallel-output shift register 119 and a data selector 120 are included.

According to this construction, image data of the address designated by the address decoder 113 is read from the dynamic memory 114 in synchronism with the 2 MHz pixel clock, and is input to the AND gates 115a–115h. The AND gates 115a–115b are opened and closed by the data selector. The gates provide zero output data when closed, and therefore the image signal after D/A conversion becomes zero level during that period. Accordingly, the pulse-amplitude-modulation is carried out on the image signal by opening and closing of the AND gates. The pulse-amplitude-modulation is carried out with the same frequency as the pixel clock, which is 2 MHz for example.

The AND gates 115a–115h are opened and closed by coaction of the shift register 119 and data selector 120. More particularly, when the shift register 117 outputs pulse signals in parallel having seven different pulse-widths to the data selector 120, the data selector 120 selects one signal from the pulse signals having seven different pulsewidths according to states of data inputs A–C, and outputs this signal to the AND gates 115a–115b. This signal opens the AND gates 115a–115b for a selected one of the periods corresponding to $\frac{1}{8}$ to $\frac{7}{8}$ of one pixel, and keeps the gates closed for the rest of the time.

Figure 23:
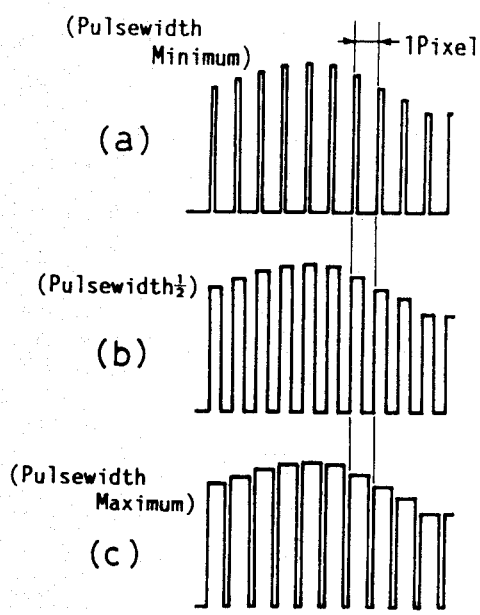
FIG. 23a, 23b, and 23c are view showing different waveforms of the image signal.
Figure 24:
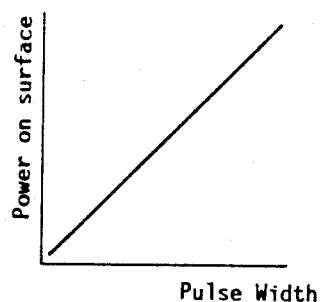
FIG. 24 is a view showing relationship between emission pulsewidth and average light power on the image forming surface.

In this way, the image signal for driving the laser diodes is pulse-modulated and its pulsewidth is varied in seven steps. FIGS. 23 (a)–(c) show the image signal modulated into different pulsewidths. The density adjustment may be effected linearly since the pulsewidth is in linear proportion to the average power of the laser beam on the image forming surface as shown in FIG. 24.

The foregoing density regulating circuit is capable of adjusting color balance when applied to the type of color printer that reproduces colors by driving three laser diodes having different wavelengths on a sensitive material which is based on the principle of substractive color mixture like an ordinary color photograph, and the power on the image forming surface is controlled by varying the pulse-width input to each laser diode. On the other hand, the image density may be varied on a color printer while retaining the color balance, by combination with the conventional method.

To effect density adjustment for the apparatus shown in FIGS. 12 et seq., the pulse duty ratio may be varied in principle. For this purpose, taking the circuit of FIG. 12 for example, the threshold value for the action of transistor 129 may be varied by manipulating the resistance of the variable resistor 131. In the case of the apparatus shown in FIGS. 14 and 18, the duty ratio of the clock pulse may be varied.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A laser recording apparatus adapted to modulate a laser beam level in accordance with a multi-tone image signal level and to cause a laser beam to scan a recording medium transversely and to form images on recording mediums with dots, said apparatus comprising, a laser light source for generating the laser beam;

drive means for driving said laser light source in accordance with the multi-tone image signal level so as to modulate the laser beam level;

means for generating pixel pulses corresponding to each dot which forms an image to be recorded;

means for outputting the multi-tone image signals to said drive means in response to each of said pixel pulses; and means for reducing said laser beam level for a certain time in each of said pixel pulses.

2. A laser recording apparatus as claimed in claim 1, wherein said reducing means reduces said multi-tone image signal level for said certain time in each of said pixel pulses.

3. A laser recording apparatus as claimed in claim 2, wherein said reducing means is a gate circuit connected with said outputting means and said generating means, and allows the multi-tone image signal to each of pass therethrough to said pixel drive means in response to said pulses.

4. A laser recording apparatus as claimed in claim 3, further comprising means for varying said certain time by varying the duty ratio of said pulses generated by said generating means.

5. A laser recording apparatus as claimed in claim 4, further comprising means for inputting a desired image density level to said varying means;

wherein said varying means varies the duty ratio in response to said desired image density level.

6. A laser recording apparatus adapted to modulate a laser beam level in accordance with a multi-tone image signal level and to cause a laser beam to scan a recording medium transversely and to form images on recording mediums with dots, said apparatus comprising, a laser light source for generating the laser beam;

drive means for driving said laser light source in accordance with the multi-tone image signal level so as to modulate the laser beam level;

means for generating pixel pulses corresponding to each dot which forms an image to be recorded;

means for outputting the multi-tone image signals to said drive means in response to each of said pixel pulses;

means for reducing said laser beam level for a certain time during every pixel pulse; and means for varying said certain time.

7. A laser recording apparatus as claimed in claim 6, further comprising means for inputting a desired image density level to said varying means;

wherein said varying means varies the duty ratio in response to said desired image density level.

8. A laser recording apparatus as claimed in claim 7, wherein said reducing means reduces said multitone image signal level for said certain time.

9. A laser recording apparatus adapted to modulate a laser beam level in accordance with a multi-tone image signal level and to cause a laser beam to scan a recording medium transversely and to form images on recording mediums with dots, said apparatus comprising, a laser light source for generating the laser beam;

drive means for driving said laser light source in accordance with the multi-tone image signal level so as to modulate the laser beam level;

means for generating pixel pulses corresponding to each dot which forms an image to be recorded;

means for outputting the multi-tone image signal to said drive means in response to each of said pixel pulses;

means for switching said laser light source between an operable status and an inoperable status; and means for controlling said switching means to place said laser light source in the inoperable status for a certain time period during each pixel pulse.

10. A laser recording apparatus as claimed in claim 9, further comprising means for varying said certain time.

11. A laser recording apparatus as claimed in claim 10, further comprising means for inputting a desired image density level to said varying means;

wherein said varying means varies said certain time in response to said desired image density level.

12. A laser recording apparatus adapted to modulate a laser beam level in response to a multi-tone image signal level and to cause a laser beam to scan a recording medium transversely and to form images on recording mediums with dots, said apparatus comprising, a first laser light source for generating the laser beam;

a feedback amplifier for driving said first laser light source in accordance with the multi-tone image signal level so as to modulate the laser beam level;

means for generating pixel pulses corresponding to each dot which forms an image to be recorded;

means for outputting the multi-tone image signals to said feedback amplifier in response to each of said pixel pulses;

means for dividing said laser beam into a laser beam for recording and a laser beam for feedback;

a second light source for generating the laser beam for a certain time during every pixel pulse;

means for superimposing said laser beam generated by said second light source on said laser beam for feedback;

means for converting the laser beam obtained by said superimposing means to an electric signal; and feedback means for feeding back said electric signal to said feedback amplifier.

13. A laser recording apparatus as claimed in claim 12, further comprising means for varying said certain time.

14. A laser recording apparatus as claimed in claim 13, further comprising means for inputting a desired image density level to said varying means;

wherein said varying means varies said certain time in response to said desired image density level.

15. A laser recording apparatus adapted to modulate a laser beam level in accordance with a multi-tone image signal level and to cause a laser beam to scan a recording medium transversely and to form images on recording mediums with dots, said apparatus comprising, a laser light source for generating the laser beam;

a feedback amplifier for driving said first laser light source in accordance with the multi-tone image signal level so as to modulate the laser beam level;

means for generating pixel pulses corresponding to each dot which forms an image to be recorded;

means for outputting the multi-tone image signals to said feedback amplifier in response to each of said pixel pulses;

means for dividing said laser beam into a laser beam for recording and a laser beam for feedback; means for converting the laser beam for feedback to an electric signal;

means for superimposing said pixel pulses generated by said generating means on said electric signal obtained by said converting means; and feedback means for feeding back the output obtained by said superimposing means to said feedback amplifier.

16. A laser recording apparatus as claimed in claim 15, further comprising means for varying said certain time by varying the duty ratio of said pixel pulses.

17. A laser recording apparatus as claimed in claim 16, further comprising means for inputting a desired image density level to said varying means;

wherein said varying means varies the duty ratio of said pixel pulses in response to said desired image density level.

* * * * *